(12) United States Patent
Strohmenger et al.

(10) Patent No.: US 8,700,539 B2
(45) Date of Patent: Apr. 15, 2014

(54) CREATING A TRAVEL COMMUNITY

(75) Inventors: Klaus Strohmenger, Werne (DE); Karsten Schoo, Dortmund (DE)

(73) Assignee: Nokia Corporation (FI)

( * ) Notice: Subject to any disclaimer, the term of this patent is extended or adjusted under 35 U.S.C. 154(b) by 499 days.

(21) Appl. No.: 11/957,644

(22) Filed: Dec. 17, 2007

(65) Prior Publication Data

US 2009/0157613 A1  Jun. 18, 2009

(51) Int. Cl.
*G06Q 99/00* (2006.01)

(52) U.S. Cl.
USPC ........................................................ 705/319

(58) Field of Classification Search
USPC ........................................................ 705/319
See application file for complete search history.

(56) References Cited

U.S. PATENT DOCUMENTS

| | | | | |
|---|---|---|---|---|
| 5,754,939 A * | 5/1998 | Herz et al. | ................... | 455/3.04 |
| 5,948,040 A * | 9/1999 | DeLorme et al. | ............. | 701/426 |
| 6,269,369 B1 | 7/2001 | Robertson | | |
| 7,050,987 B2 * | 5/2006 | Lettovsky et al. | ................. | 705/6 |
| 7,310,676 B2 * | 12/2007 | Bourne | ........................... | 709/227 |
| 7,440,918 B2 * | 10/2008 | Boyle et al. | ...................... | 705/37 |
| 7,599,847 B2 * | 10/2009 | Block et al. | ........................ | 705/5 |
| 7,680,770 B1 * | 3/2010 | Buyukkokten et al. | ........ | 707/758 |
| 8,280,913 B2 * | 10/2012 | Bergin | ........................... | 707/793 |
| 2002/0032735 A1* | 3/2002 | Burnstein et al. | ............. | 709/204 |
| 2003/0055689 A1* | 3/2003 | Block et al. | ........................ | 705/5 |
| 2003/0163249 A1 | 8/2003 | Kapolka et al. | | |
| 2004/0049424 A1* | 3/2004 | Murray et al. | ................... | 705/14 |
| 2006/0004590 A1* | 1/2006 | Khoo | ................................ | 705/1 |
| 2006/0041586 A1* | 2/2006 | Nassef | ........................ | 707/104.1 |
| 2007/0005419 A1* | 1/2007 | Horvitz et al. | .................. | 705/14 |
| 2007/0038351 A1 | 2/2007 | Larschan et al. | | |
| 2007/0179863 A1* | 8/2007 | Stoll | .............................. | 705/26 |
| 2007/0282661 A1* | 12/2007 | Franco | .............................. | 705/9 |
| 2008/0080397 A1* | 4/2008 | Niranjan et al. | ............. | 370/254 |
| 2008/0091445 A1* | 4/2008 | Mihic | .............................. | 705/1 |
| 2008/0098313 A1* | 4/2008 | Pollack | ......................... | 715/753 |
| 2008/0263076 A1* | 10/2008 | Duffield et al. | ............... | 707/102 |
| 2009/0077061 A1* | 3/2009 | Abercrombie et al. | .......... | 707/5 |
| 2010/0017371 A1* | 1/2010 | Whalin et al. | .................... | 707/3 |

FOREIGN PATENT DOCUMENTS

DE  102006024297 A1  11/2007
EP  0303371 A  2/1989

OTHER PUBLICATIONS

Crider, Sabrina. SideStep Launches Social Travel Application on Facebook Platform. Business Wire. New York, May 24, 2007.*
iPling to iPhone—Good Morning Mate. PR Newswire. San Francisco. Nov. 9, 2007.*

(Continued)

*Primary Examiner* — Amanda Kirlin
(74) *Attorney, Agent, or Firm* — Banner & Witcoff, Ltd.

(57) ABSTRACT

A user may be matched to a community or another user based on travel information such as destination, route, time to arrival and the like. Thus, a user traveling to a destination may be able to communicate with or meet other users traveling to the same destination. Other information may also be used in determining matches including habits, interests or relationship status. In one arrangement, travel information may automatically be obtained from a navigation engine while a user is traveling. The travel information may be automatically sent from the navigation engine or a communication system associated therewith to a server configured for identifying matches between users or between users and communities. A user may further set a match threshold to control the number of matches that are returned. Recommendations for restaurants, activities, hotels and the like may also be determined based on the history and profile of matching users.

19 Claims, 9 Drawing Sheets

(56) References Cited

OTHER PUBLICATIONS

International Search Report and Written Opinion for International Application No. PCT/IB2008/003221, mailed Feb. 20, 2009, 14 pages.

Even/Trail—GPS travel community, geotagging, geotagged photos, Google Maps, PGS tracks, waypoints, coordinates, downloaded from <http://www.everytrail.com> on Dec. 13, 2007, 11 pages.

\* cited by examiner

CREATING A TRAVEL COMMUNITY

TECHNICAL FIELD

Aspects of the invention generally relate to creating a travel community. In particular, aspects relate to determining location, destinations and characteristics of users who are traveling and using such information to create a community of users.

BACKGROUND

The popularity of automated navigation systems has grown significantly. Oftentimes, vehicles such as cars come equipped with navigation systems pre-installed. In other instances, individuals purchase stand-alone portable navigation systems that may be used in various environments. Navigation systems are typically configured to provide a user with his or her location, an estimated time of arrival at a specified destination, recommended routes/directions and the like. In some instances, multiple users may be traveling, have traveled or are planning to travel to the same destination. Thus, it may be desirable for such users to communicate with one another with respect to travel companionship, directions, recommendations and the like. Currently, in order for a user to find others with similar travel interests, users generally must manually enter information about their destinations or planned destinations into a computer connected to a network like the Internet. Alternatively or additionally, users may manually search for desired forums or users over the Internet. However, such methods often require the entry of data that might have already been generated by a navigation engine.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects relating to the creation of travel communities and identifying matches between travelers include the automatic use of navigation or travel information, generated by a navigation engine, to match an individual with one or more other individuals having similar travel profiles. In one example, an individual traveling to a destination may automatically have a navigation system, or a communication system associated therewith, transmit travel data to a community server. The community server may receive the travel data and attempt to match it with the travel data of one or more other individuals. The one or more other individuals may also be traveling to the destination, may be planning to travel to the destination or may have traveled to the destination in the past. The community server may store profiles for each user including interests, contact information, personal information, travel history and the like. In one or more arrangements, matches may be determined based on not only travel data, but also a user profile (e.g., a profile storing music, food or activity interests). Once a match has been identified, the matching individuals may be placed into a community related to the travel destination or some other mutual interest. The community may include a forum, a chat room, an e-mail listserv and the like.

According to one aspect, a community server may be configured to provide recommendations to a user based on travel data or profile information. For example, a community server may provide food, rest stop, route, hotel or attraction recommendations based on the user's travel information or user profile. In one or more configurations, the server may make such recommendations based on the profiles of one or more other matching users. Thus, if a community server determines that a match exists between a first user and a second user, e.g., based on same destination or mutual interests, the restaurants or hotels that the second user has visited may be recommended to the first user.

According to another aspect, a first user may be able to track the travel progress of a second user using the travel information reported by a navigation system of the second user to the community server. For example, a first user may log on to a travel tracking interface that allows the first user to view and track travel of a second user. In one or more arrangements, a first user might only be able to track the travel of a second user if the second user approves or if the two users are in at least one mutual community.

BRIEF DESCRIPTION OF THE DRAWINGS

Certain embodiments are illustrated by way of example and not limited in the accompanying figures in which like reference numerals indicate similar elements and in which.

DETAILED DESCRIPTION OF THE INVENTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
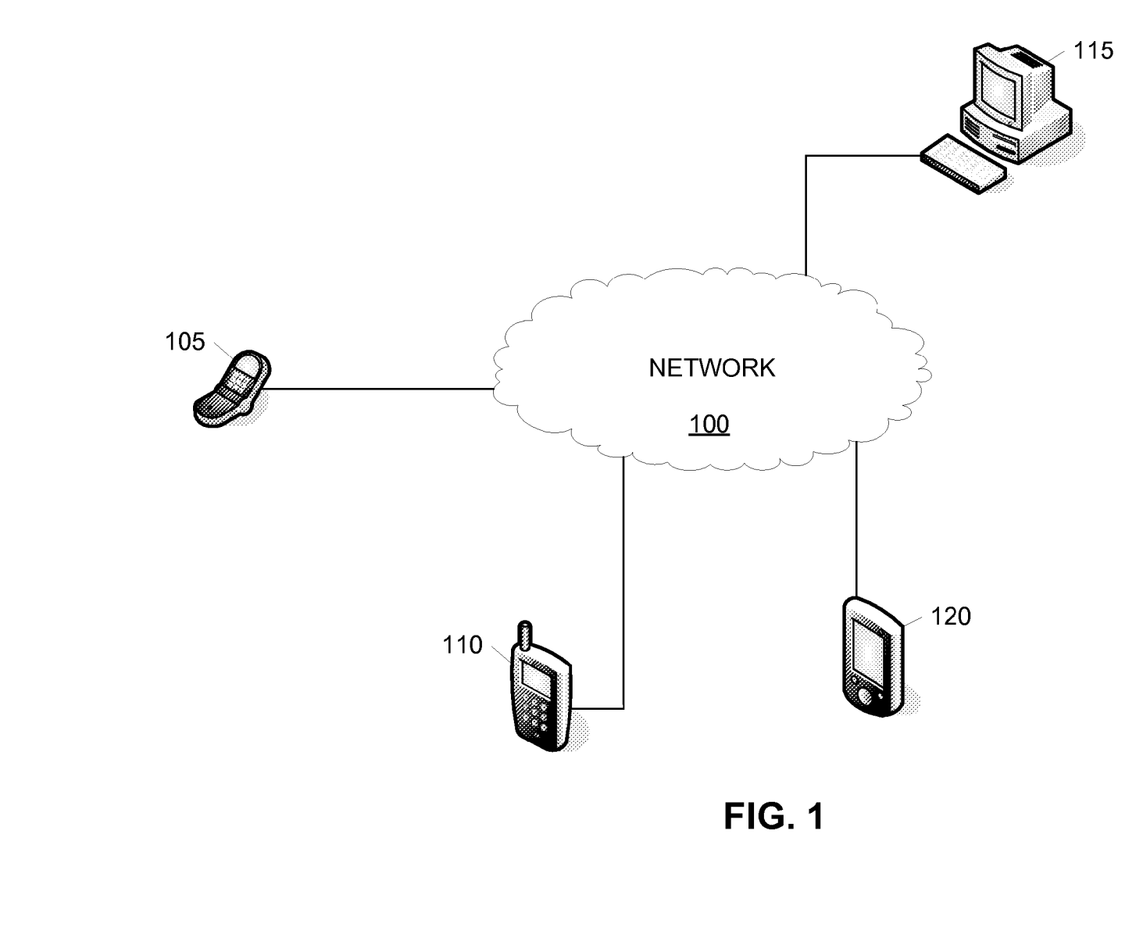
FIG. 1 illustrates a block diagram of a communication network in which one or more embodiments may be implemented.

Various embodiments may be used in a broad array of networks and communication protocols. FIG. 1 illustrates an example of a communication network through which data may be exchanged according to one or more aspects described herein. Specifically, communication network 100 includes mobile communication devices 105 and 110, personal computer (PC) 115 and personal data assistant (PDA)

120. PC, as used herein, is not limited to any particular operating system or platform. Communication devices may be included in one or more mobile environments such as a car, plane, boat or train such that data may be transmitted to and from any of these locations to other devices connected to the network. Communication through network 100 is not limited to the illustrated devices and may include other apparatuses such as a home video storage system, a portable audio/video player, a digital camera/camcorder, a positioning device such as a GPS (Global Positioning System) device or satellite, a mobile television, a STB (Set-top Box), a digital video recorder, and the like and in any combination of the aforementioned.

Devices 105, 110, 115 and 120 may be connected to each other through various types of networks. For example, mobile communication devices 105 and 110 may communicate with one another through a cellular network, a short range communication connection (such as a Bluetooth®, UWB (Ultra Wide Band), infrared, WiBree), a wireless local area network (WLAN) or a high-speed wireless data network, e.g., Evolution-Data Optimized (EV-DO) networks, Universal Mobile Telecommunications System (UMTS) networks or Enhanced Data rates for GSM Evolution (EDGE) networks. In one or more arrangements, mobile communication devices 105 and 110 and other devices like PC 115 and PDA 120 may communicate through a wired network. Further, devices 105, 110, 115 and 120 may use various communication protocols such as Internet Protocol (IP), Transmission Control Protocol (TCP), Simple Mail Transfer Protocol (SMTP) among others known in the art.

Figure 2:
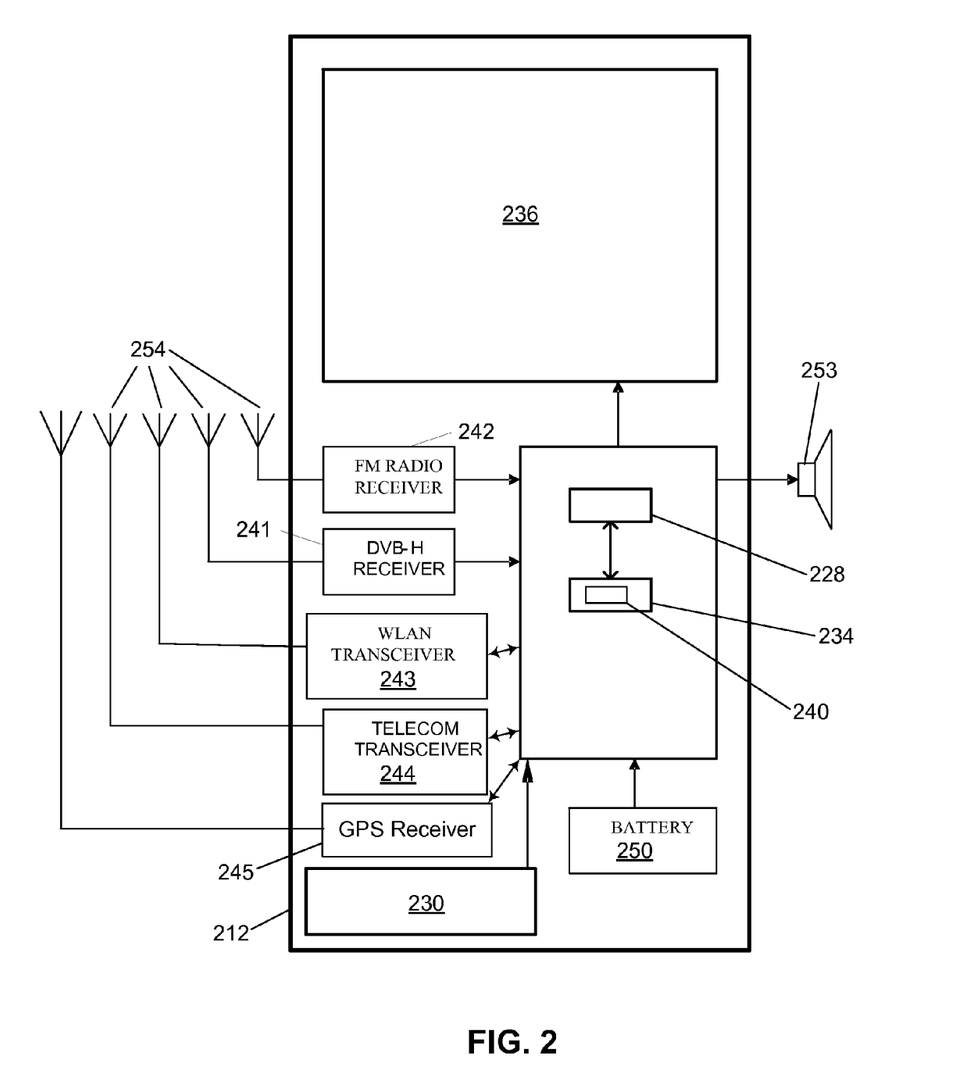
FIG. 2 illustrates a block diagram of a communication device according to one or more aspects described herein.

FIG. 2 is a block diagram of a communication device such as mobile communication device 105 including processor 228 connected to user interface 230, memory 234 or other storage, and display 236. Communication device 212 may also include battery 250, speaker(s) 253 and antennas 254. User interface 230 may further include a keypad, touch screen, voice interface, one or more arrow keys, joy-stick, data glove, mouse, roller ball, or the like. Communication device 212 may comprise a computer, PDA, mobile telephone and the like.

Computer executable instructions and data used by processor 228 and other components within communication device 212 may be stored in a computer readable memory 234. The memory may be implemented with any combination of read only memory modules or random access memory modules, optionally including both volatile and nonvolatile memory. Software 240 may be stored within memory 234 or storage to provide instructions to processor 228 for enabling communication device 212 to perform various functions. Alternatively, one or more modules of communication device 212 may be embodied in hardware or firmware (not shown).

Communication device 212 may be configured to receive, decode and process digital radio or television broadcast transmissions that are based, for example, on the DVB (Digital Video Broadcasting) standards, through a specific DVB receiver 241. The mobile device may also be provided with other types of receivers for digital broadcast transmissions, such as ATSC (Advanced Television Systems Committee), MediaFLO, DMB (Digital Multimedia Broadcasting), ISDB (Integrated Services Digital Broadcasting), HDTV (High-definition television), DAB (Digital Audio Broadcasting), DRM (Digital Radio Mondiale), etc. Additionally, communication device 212 may also be configured to receive, decode and process transmissions through FM/AM Radio receiver 242, WLAN transceiver 243, and wireless telecommunications transceiver 244. Transceivers 243 and 244 may, alternatively, be separated into individual transmitter and receiver components (not shown). In one example, transceiver 244 may include a broadcast receiver (not shown) and a backward channel receiver (not shown) for communicating over the broadcast channel and the backward channel, respectively.

Additionally, communication device 212 may further include a navigation engine for determining a position of communication device 212. In one example, the navigation engine may include Global Positioning System (GPS) receiver 245 for receiving position information from a GPS satellite (not shown). In another example, a navigation engine may include a triangulation engine that is configured to determine a position of communication device 212 using cellular triangulation techniques. Other location determination methods and system may also be used as an alternative or in addition to the techniques described herein.

According to one aspect, communication device 212 may receive Radio Data System (RDS) messages. Other transmission and reception systems may also be used including BLUETOOTH®, WiMAX (Worldwide Interoperability for Microwave Access) i.e., Institute of Electrical and Electronics Engineers (IEEE) 802.16 standard, or UWB (Ultra-wideband) transceivers. In one or more instances, signals may be transmitted to and received from another mobile terminal (not shown). For example, audio, video and other signals may be transmitted between two communication devices using various transmissions protocols such as wireless local area networks (WLANs), General Packet Radio Service (GPRS), third generation mobile system technology (3G), Bluetooth or Universal Plug and Play (UPnP). Such networks may be used to access or support local networks or remote networks such as the Internet.

Figure 3:
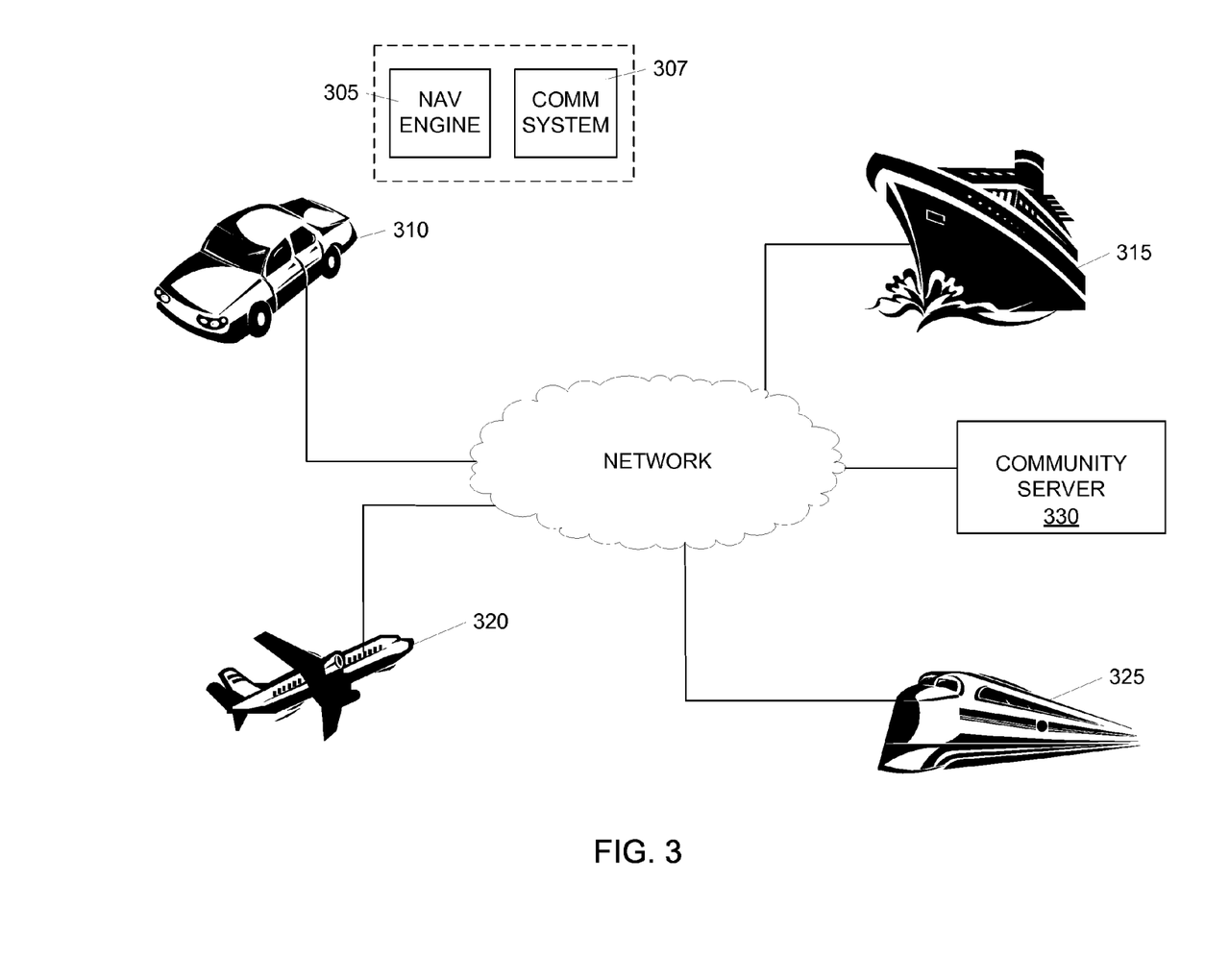
FIG. 3 illustrates an operating environment including multiple mobile environments in which one or more aspects described herein may be used.

FIG. 3 illustrates an operating environment in which users may be traveling in a mobile environment such as car 310, ship 315, airplane 320 and train 325. Each of these mobile environments may include a navigation device such as navigation engine 305 that is able to detect its own location. For example, GPS navigation systems use satellite information to determine coordinates for the navigation system's current location. Alternatively or additionally, in one or more arrangements, a traveling user may carry a mobile navigation device such as a mobile phone, laptop computer, PDA or other handheld navigation system onto one or more of environments 310, 315, 320 and 325. Thus, in instances where the mobile environment might not include a navigation system, a user's position may still be determined using a personal navigation device. Navigation devices such as navigation engine 305 may be configured to determine and provide other information such as a time to destination, a current elapsed time, an estimated time of arrival, weather, traffic and the like.

Further, mobile environments 310, 315, 320 and 325 may include a communication system such as communication device 307 that is configured to send and receive data over a network. In one example, communication device 307 may include communication device 212. According to one aspect, location and other navigation information may be transmitted to and received from one or more other environments 310, 315, 320 and 325, a remote server 330 or other destinations via a communication network (e.g., network 100 of FIG. 1) via communication device 307. Communication device 307 and navigation engine 305 may be included in a single system or device or, alternatively, may be two separate devices that are configured to communicate with one another. For example, communication device 307 (e.g., a cell phone) and navigation engine 305 (e.g., a handheld navigation system) may both have BLUETOOTH communication capabilities and may thus be able to transmit and receive information over a BLUETOOTH connection. Other types of long range and short range connections and networks may also be used.

In the environment illustrated in FIG. 3, a user traveling to a particular destination may, in addition to tracking his or her own travel progress, transmit his or her navigation information (e.g., location, estimated time to arrival, distance, etc.) to one or more other devices. In one example, the navigation data may be sent to community server 330 that is configured to create communities of users based on travel destinations. That is, the community server may identify matches between users based on past, current or future travel information. Accordingly, if a first individual is currently traveling to Paris, France, the community server may match the first individual with a second individual who is also going to Paris, has been to Paris in the past or will be going to Paris in the future. Thus, a community may be created between the first and second individuals. Alternatively, the first and second individuals may be added to an already existing community related to travel to Paris. In one or more examples, the community server may create communities for individuals who are projected to be in Paris at the same time. Thus, individuals traveling to the same destination may be able to get to know one another while traveling to the destination. Further, a traveling user may be able to gain additional information about a destination prior to arrival.

A community server may further be configured to host one or more communities. For example, a community server may be host a variety of communities dedicated to different vacation destinations. Different communities may also be created for various non-travel interests such as music and food.

Figure 4:
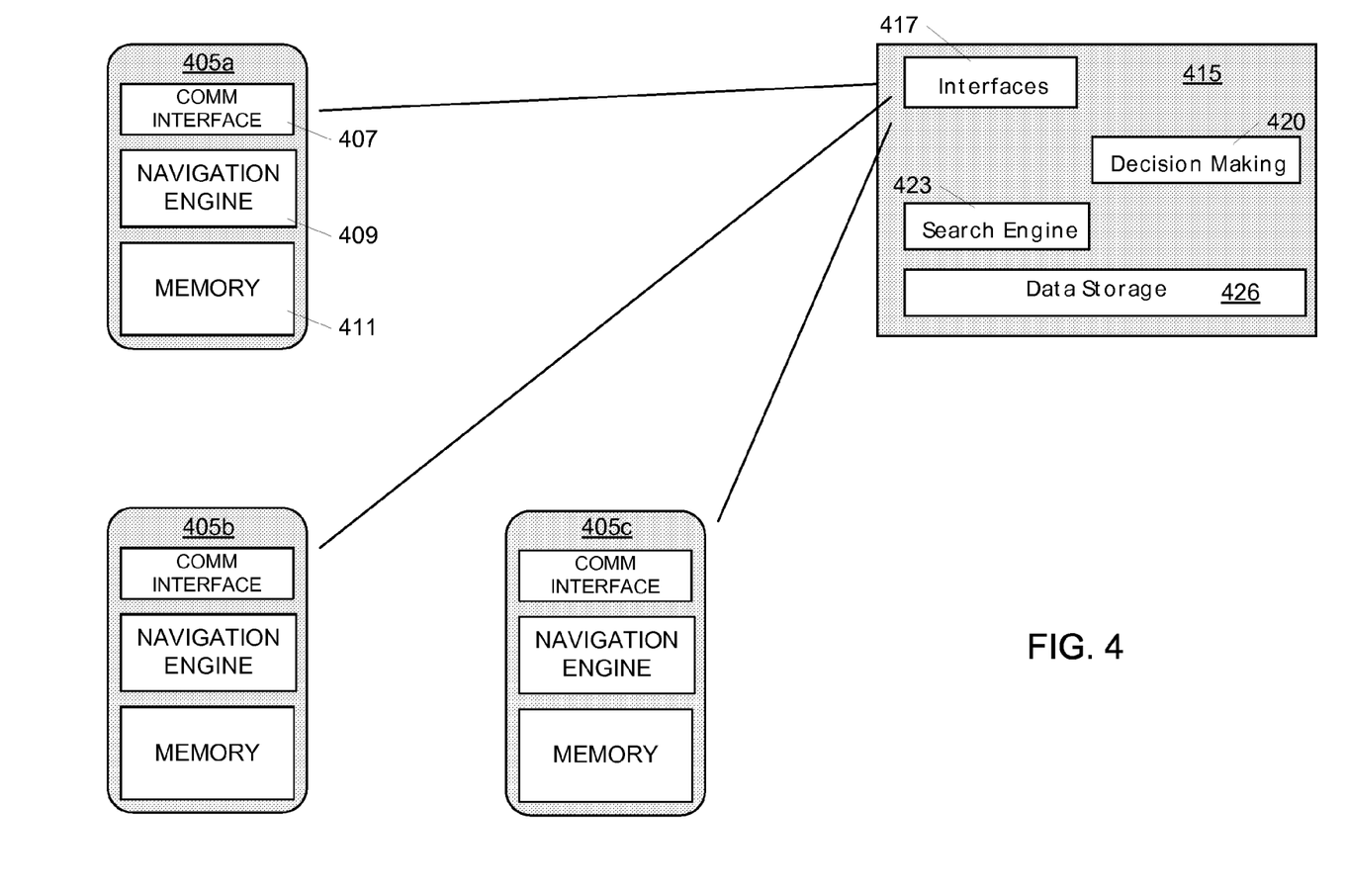
FIG. 4 illustrates a block diagram of a network environment including a plurality of mobile devices and a server system according to one or more aspects described herein.

FIG. 4 illustrates a block diagram of mobile devices, a community server system and connections therebetween that may be used to obtain location information and to match individuals based on such data. Mobile units 405a-c may each include a variety of components including a communication interface 407, a navigation engine 409 and memory 411. Communication interface 407 may include various types of receivers and transmitters that are compatible with various types of networks as described previously. Navigation engine 409 may be used to obtain location information from one or more sources such as cell towers (e.g., using triangulation) or GPS satellites. Navigation engine 409 may also be used to calculate (or otherwise determine) estimated time to arrival based on speed, traffic and the like, generate a graphical user interface to display a route or directions, generate directions and the like. Memory 411 may store a variety of information including application instructions, application data or audio/video content. According to one aspect, memory 411 may be configured to store user profile information including interests and characteristics such as age, marital status and gender. User profile information may be used in conjunction with navigation information in forming communities between users.

Communication server system 415 may include a communication interface 417 for communicating with mobile devices 405a-c. In addition, communication server system 415 may include decision making engine 420, search engine 423 and data storage 426. Data storage 426 may be configured to store various types of data including user profiles, account information, community information (e.g., membership data) and the like. Decision making engine 420 may be configured to match users of mobile devices 405a-c with one another based on travel or personal profiles. Search engine 423, on the other hand, may be configured for searching for users or other data in data storage 426 matching a specified criterion. For example, search engine 423 may be used to find all users who have visited New York City. In one or more arrangements, decision making engine 420 and search engine 423 may be configured as a single processor. Alternatively, engines 420 and 423 may be configured as separate processing engines.

Figure 5:
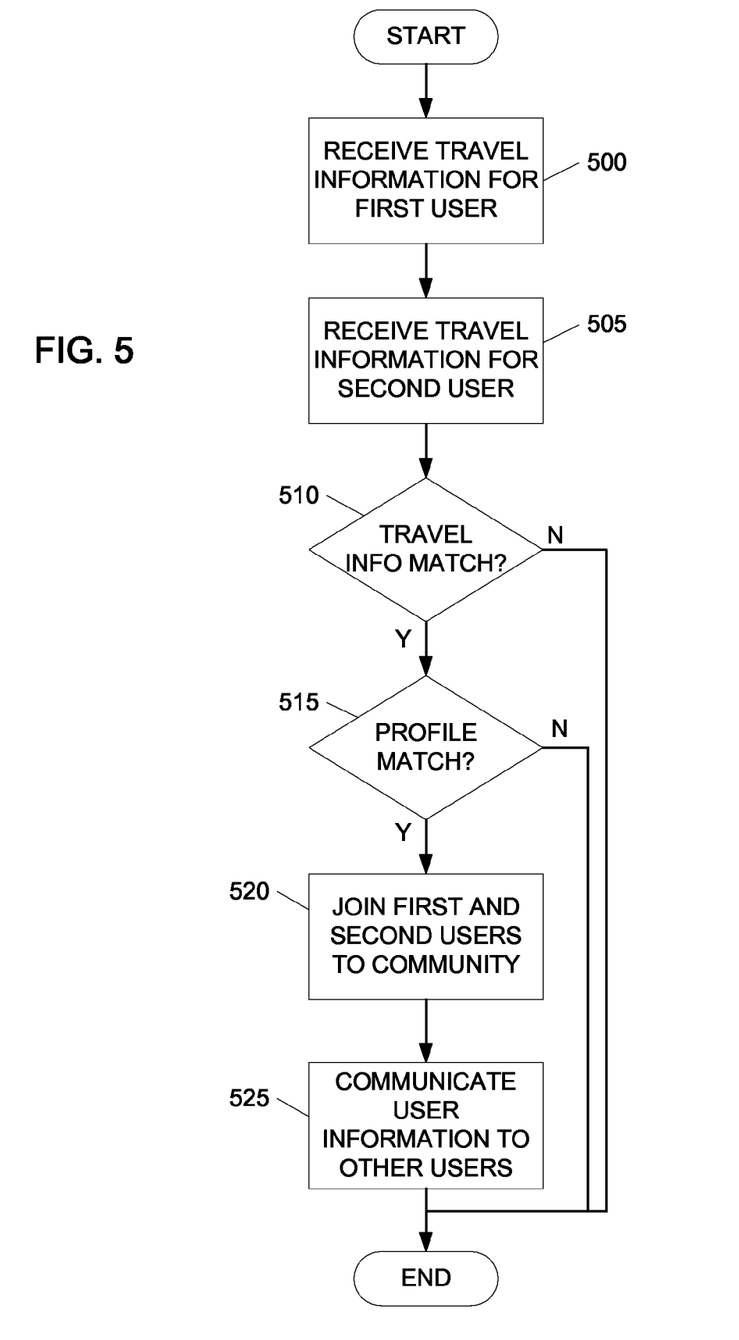
FIG. 5 is a flowchart illustrating a method for identifying matches between users and joining a user to a community according to one or more aspects described herein.

FIG. 5 is a flowchart illustrating a method for matching users based on travel attributes and creating communities between matching users. In step 500, a community server may receive travel information for a first user from a first communication device. For example, the first communication device may be a navigation system or a mobile telephone that is configured to communicate with the community server. In step 505, the community server may receive travel information for a second user from a second communication device. As discussed herein, navigation information may correspond to information relating to past travel, future travel or current travel. In step 510, the community server may compare the travel information received from the first communication device with the travel information received from the second communication device to determine whether a travel match exists. A travel match may be defined in a variety of ways including destination location matches, arrival time matches, time of travel matches, route matches, travel method matches (e.g., mode of transportation matches) or combinations thereof. In one example, a travel match may be defined by a first user and a second user being projected to arrive at the same destination within a predefined amount of time of each other (e.g., 1 hour, 30 minutes, 1 day, etc.). In another example, a travel match may be defined by two users staying at the same hotel or within a predefined proximity. If a travel match does not exist, a community might not be formed between the first and second users and the process may end. Alternatively or additionally, if a travel match does not exist, a notification may be sent to the first user indicating as much.

If, on the other hand, a travel match is determined to exist, the community server may optionally determine whether a second match exists between user profile information of the first user and user profile information of the second user in step 515. The user profile information for each user may be received after it has been determined that a travel match exists or at approximately the same time as receipt of the travel information. User profile matches may include non-travel attribute matches such as age matches, marital/relationship status matches, interest matches and the like. If a match is determined not to exist between the user profile information of the two users, a community might not be formed between the first and second users and the process may end. If, however, a user profile match is determined to exist, the first and second users may be joined to a community directed or targeted to a travel destination of the users, one or more interests shared by the users or a combination thereof in step 520. In one example, the community may include a forum that allows the users to communicate with one another via postings. In another example, the community may include one or more instant messaging features that allow real-time communication between the users. The community server may further communicate each of the user's information such as contact information, profile information or travel information to the other user in step 525. In one example, travel information may include road conditions, traffic, weather, points of interest and the like. Contact information may include a network address, instant messaging screen name, e-mail address or telephone number of the matching users. This step may be optional and may be subject to privacy preferences set by a user.

According to one or more aspects, the individuals may be matched and joined to a pre-existing community that has already been formed for a particular destination or a particular set of interests. Thus, the individuals may be connected not only to one another but also with one or more other individuals who are already members of the community (e.g., individuals who share similar interests or that have traveled, are traveling or are planning to travel to the same destination). Alternatively, a new community may be created if a community directed to the mutual interests or to a common travel destination of the first and second users does not already exist. A notification may also be sent to the other members of a community when a new individual joins.

Figure 6:
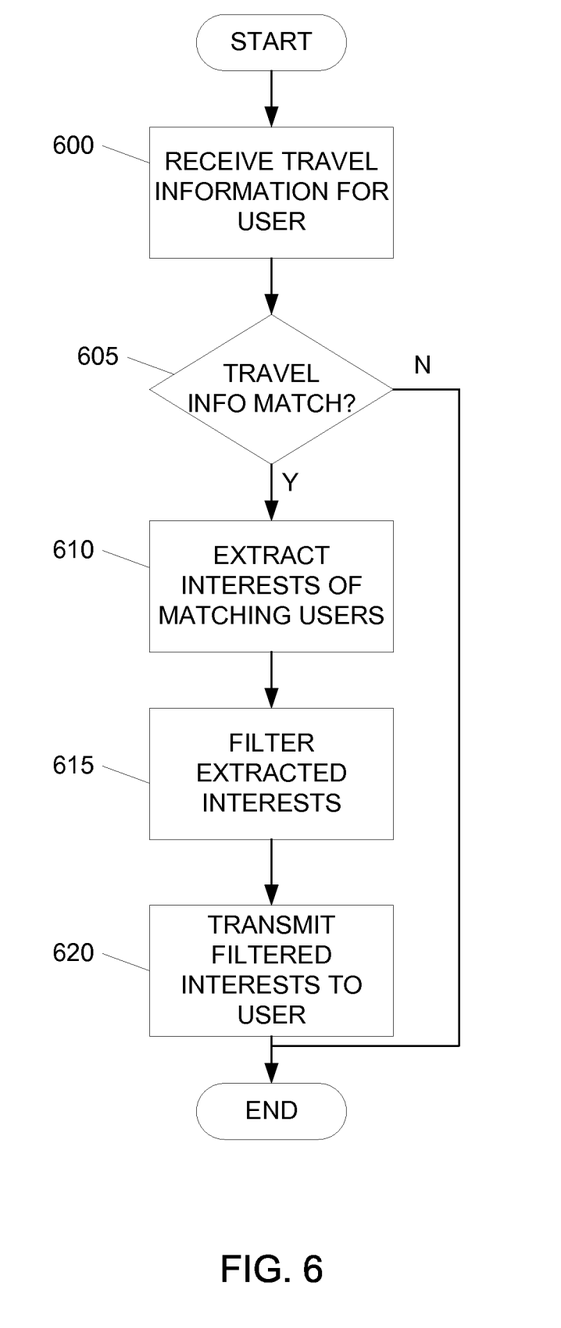
FIG. 6 is a flowchart illustrating a method for determining recommendations for a traveling user according to one or more aspects described herein.

In addition to facilitating communication between individuals having similar travel experiences or personal interests, a community server may also be configured to make recommendations to an individual regarding a variety of topics such as travel destinations, restaurants (e.g., at a specified destination), music to be played during the trip, routes to take or avoid, and the like. FIG. 6 illustrates a method for determining recommendations based on matching travel and profile information. In step 600, a community server may receive travel information from an individual. The community server may then compare the travel information of the individual to the travel information associated with one or more other individuals to determine if a match exists in step 605. A match may be defined based on a predefined threshold of matching destinations, travel regions, continents, cultural similarities or combinations thereof.

If a match exists between the travel information of the individual and the travel information of one or more other individuals, the community server may extract one or more interests of the one or more matching individuals in step 610. The one or more interests may include various aspects of previous travel (e.g., a travel history) such as destinations that the one or more other individuals have visited, landmarks visited by the one or more other individuals or tourist activities recommended by the one or more other individuals. The one or more interest may also include non-travel related interests such as music and food. In step 615, the extracted one or more interests may be filtered using the profile information of the current individual. For example, if the current individual's user profile indicates a dislike for monuments, landmark interests relating to monuments may be filtered out of the recommendations. In another example, if a user profile indicates that the individual prefers outdoors activities, indoor activities may be filtered out of recommended tourist activities. In step 620, the filtered recommendations may then be transmitted to the individual.

Figure 7:
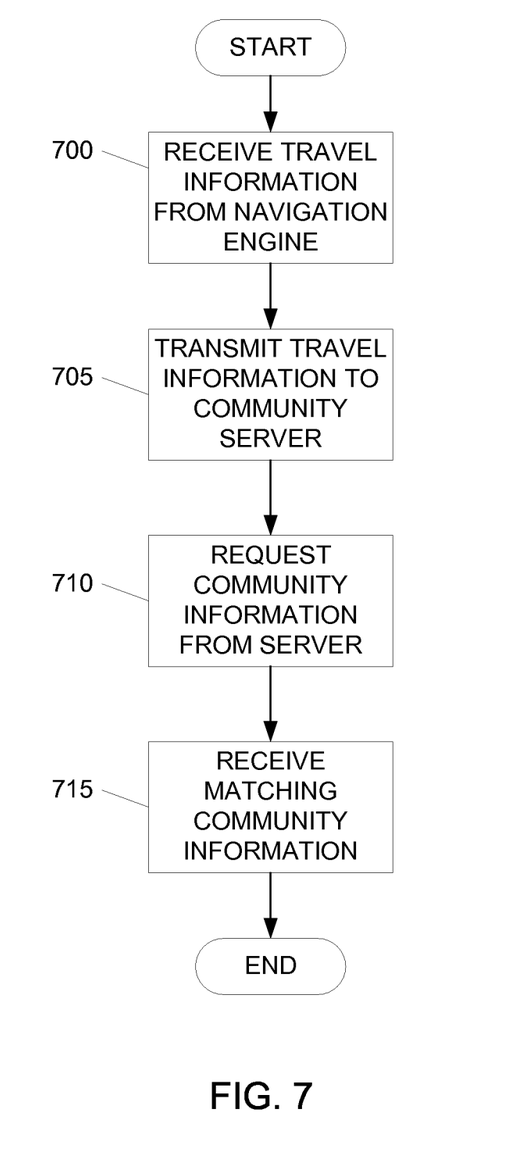
FIG. 7 is a flowchart illustrating a method for requesting community or contact information using navigation data according to one or more aspects described herein.

FIG. 7 is a flowchart illustrating a method for seeking communities based on travel information. In step 700, a user's communication device may receive travel information (e.g., destination, current, location, travel time, arrival time, etc.) from a navigation engine. The navigation engine may be resident in the communication device or may be a separate device. Travel information may be determined based on, in one or more instances, user input indicating a desired destination, a preferred travel route (e.g., maximize highways, avoid tolls, avoid traffic, etc.) and the like. Upon receipt, the communication device may transmit the travel information to a community server in step 705. In one or more arrangements, an individual or a communication device thereof may have an account established with the server. Thus, other information associated with the communication device or user such as previous trip information and user interests may already be stored in the server.

In step 710, the communication device may transmit a request for community information from the server. The identification of a community server may be pre-programmed into a communication or navigation system or may be specified by a user. A community server may host multiple communities. The request may alternatively be transmitted along with the travel information in step 705. In step 715, the communication device may receive community information and match results from the server. Match results may include an indication of a number of other users having travel information that matches the travel information of the present user, a level of match for each of the other users or contact information for each of the other users. Community information, on the other hand, may include contact information for a community forum to which the user has been joined, links to community blogs, recommendations from others in the community and the like. In one or more arrangements, the communication device may receive a request from the server to confirm that the user wishes to join the community or wishes to receive the match results prior to receiving the match results or being joined to a community.

In one embodiment, a user may set a threshold for match results or community association. That is, a user may specify that he or she only wishes to receive matches or be joined to communities where his or her profile or travel information is at least a 75%, 85% or 90% match with the community profile or the profiles of other users. A user may also set a limit on the number of users or communities to which he or she is matched or joined.

Figure 8:
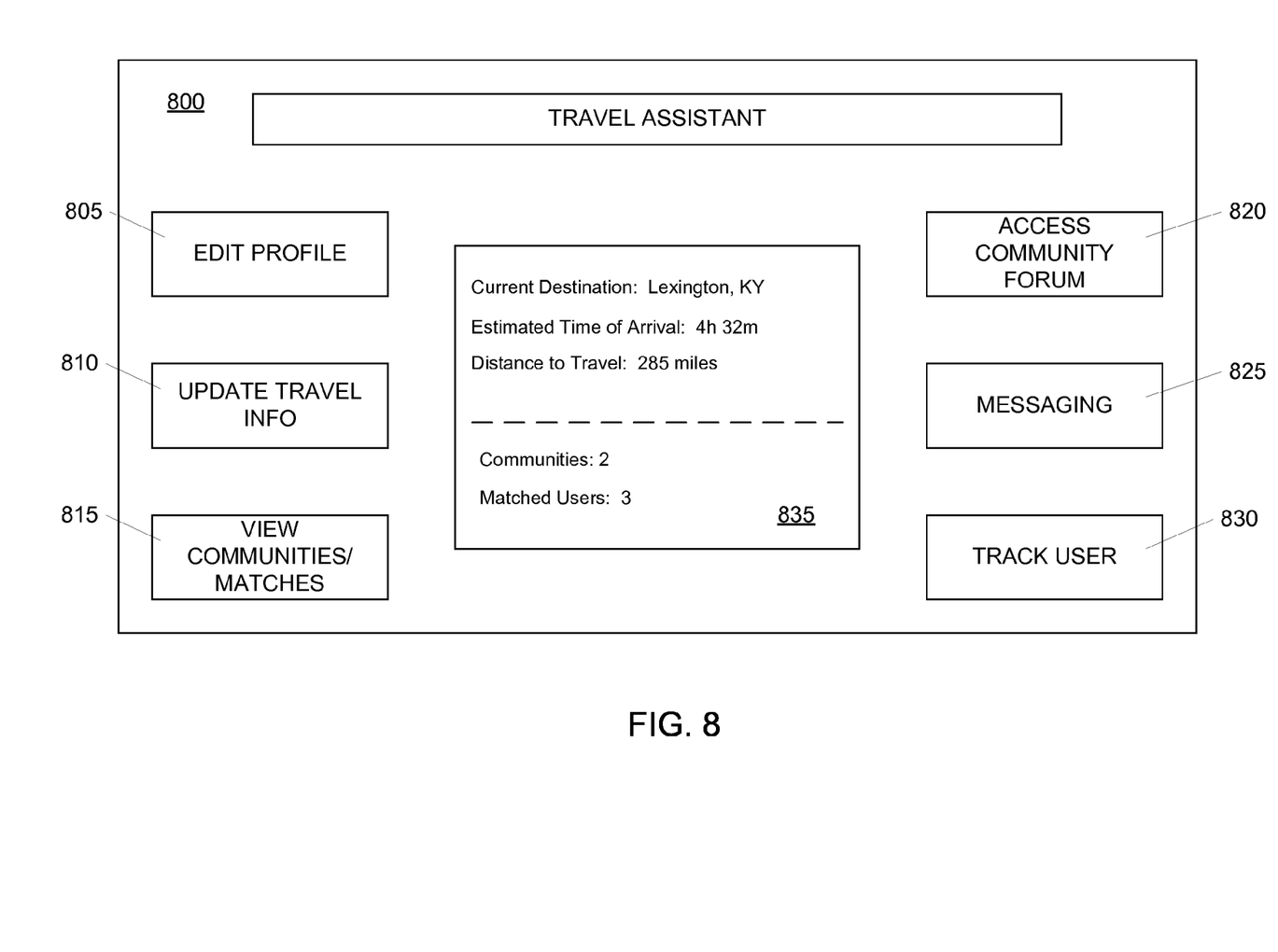
FIG. 8 illustrates a communication interface according to one or more aspects described herein.

FIG. 8 illustrates a user interface of a communication device that transmits travel information or user profile information to a community server and receives community information and recommendations in response. Interface 800 may include a variety of options including edit profile 805, update travel information 810, view communities/matches 815, access community forum 820, messaging 825 and track user 830. Selecting edit profile 805 may allow a user to change various aspects of his or her profile including match thresholds, interests, contact information, privacy levels (e.g., showing only a defined pieces of contact information) and the like. A password may be required to edit the user's profile. Update travel information 810 may be a toggle switch or a command that requests updated information from a navigation engine. The communication device may further optionally transmit the updated information to the community server in response to update travel information 810 being selected. View communities/matches option 815 allows a user to view the communities to which he or she has been joined or individual matches. Access community forum 820 and messaging 825 may offer two modes of communication. For example, access community forum option 820 may allow a forum-like communication interface where a user may post messages. Messaging 825, on the other hand, may allow a user to send a private instant message type communication to another individual. Track user option 830 may be used by an individual to track the travel behavior of another individual. For example, an individual may want to view the progress a friend is making in reaching a mutual destination. In another example, a parent may want to monitor a child's travel progress in reaching a particular destination.

Additionally, interface 800 may further include an information pane 835 displaying information such as a current destination, estimates time of arrival, distance to travel, a number of communities and users to which the traveler has been matched and the like. A user may configure the display to show various additional or alternative information based on his or her needs or preferences.

While travel communities and various other aspects described herein have been discussed with respect to mobile environments such as motor vehicles, a user may access communities and use the various features described herein from a stationary PC or other device. For example, a user at home may be able to communicate with individuals that are currently traveling to a destination and vice versa. A user in a stationary location may also track travel progress of one or more other individuals as well.

Further, travel information or user profile information may be updated periodically or aperiodically depending on the preferences of a user, requests by a community server or the availability of new information (e.g., if a navigation engine only detects location every 5 minutes, 30 minutes, hour or day). Thus, according to one aspect, matches may be updated periodically or aperiodically. For example, a user may be disassociated with a community if the user changes his or her destination and this change is updated to the community server.

Figure 9:
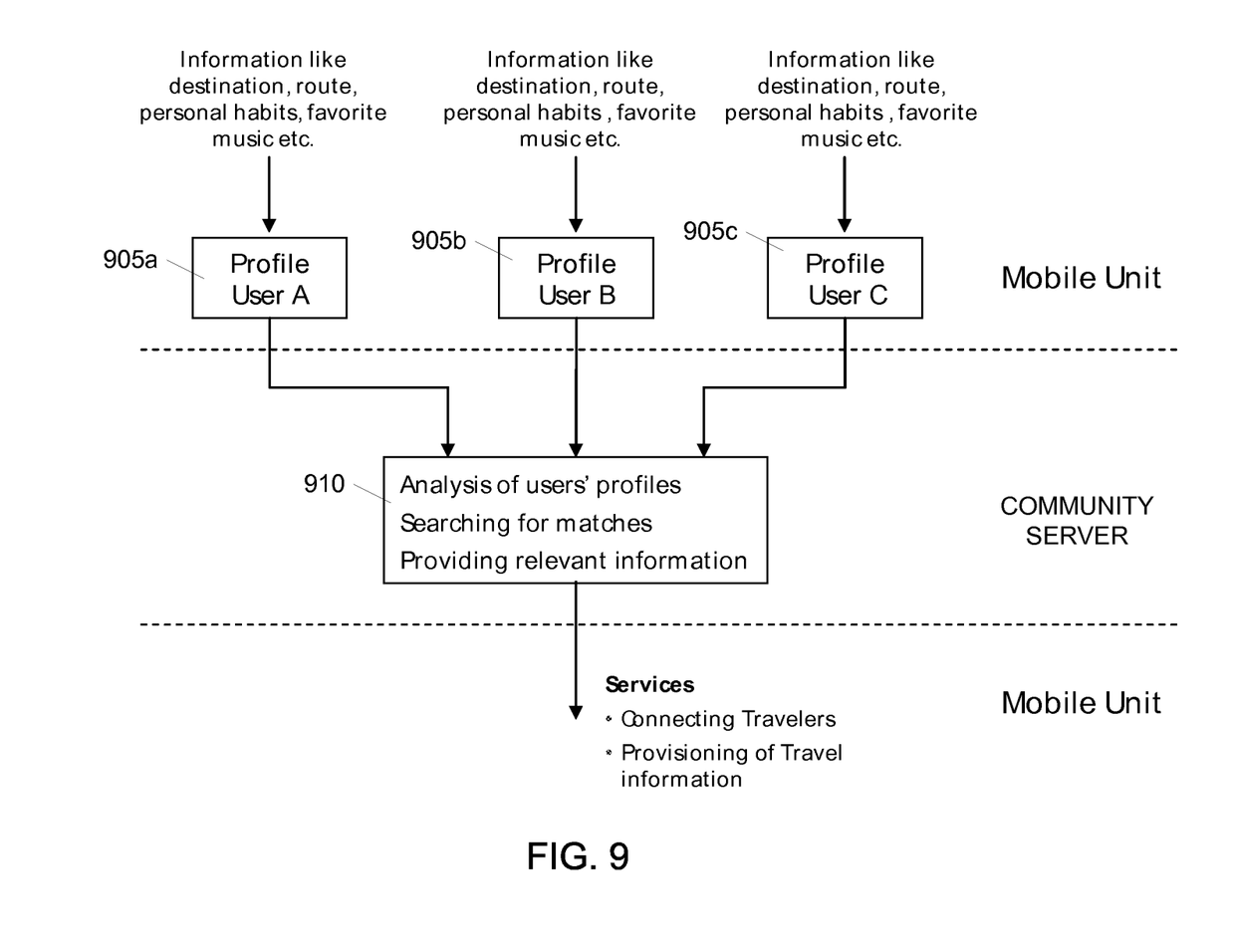
FIG. 9 illustrates a flow of information between mobile devices and a server system according to one or more aspects described herein.

FIG. 9 illustrates a block diagram showing a flow of information from multiple mobile devices 905a-c to a community server 910 and vice versa. Each of mobile devices 905a-c may store profile information for a corresponding user. Profile information may include destination, route, personal habits, interests or favorite music. Profile information may be sent to a community server 910, which may be configured to analyze the profiles, search for matches between profiles and provide relevant information such as contact information for matches, community information for matching communities, recommendations and the like. For example, the relevant information may be provided to a fourth mobile device (not shown) for which matches, recommendation or other information is being determined. Alternatively or additionally, information may be transmitted back to each of devices 905a-c based on whether matches were found between the users of devices 905a-c.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

The term "processor" or "processors" in combination with memory should be understood to include any of the foregoing combinations of hardware or software to carryout steps or functions.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
   receiving, by a computer, trip data of a first user associated with a first mobile device, wherein
the trip data of the first user relates to a trip by the first user and includes first position information determined by an automated navigation engine of the first mobile device, wherein the first position information indicates one or more positions of the first mobile device, each of the one or more positions of the first mobile device being a position of the first mobile device at an instance of time;
   receiving, by the computer, trip data of a second user associated with a second mobile device, wherein the trip data of the second user relates to a trip by the second user and includes second position information determined by an automated navigation engine of the second mobile device, wherein the second position information indicates one or more positions of the second mobile device, each of the one or more positions of the second mobile device being a position of the second mobile device at an instance of time;
   determining, by the computer, whether the trip data of the second user matches the trip data of the first user;
   determining, by the computer, whether profile information of the second user matches profile information of the first user; and
   in response to determining that the trip data associated with the second user matches the trip data of the first user and to determining that the profile information of the second user matches the profile information of the first user:
      determining a set of criteria from the trip data of the second user and the trip data of the first user,
      comparing data of one or more existing communities with the set of criteria,
      determining that the one or more existing communities do not match the set of criteria based on the comparison,
      responsive to determining that the one or more existing communities do not match, creating a community between the first and second users that is accessible to the first user and the second user and provides interaction between the first user and the second user, and
      transmitting a notification identifying the community to each of the first mobile device and the second mobile device.

2. The method of claim 1, further comprising:
   determining information indicative of interests of the second user,
   filtering the information indicative of the interests of the second user based on the profile information of the first user, wherein said filtering includes filtering out at least one indication of interest from the information indicative of the interests of the second user and said filtering results in filtered information indicative of at least one interest of the second user, and
   transmitting, to the first mobile device, the filtered information indicative of at least one interest of the second user.

3. The method of claim 1, wherein determining whether the trip data of the second user matches the trip data of the first user comprises determining whether a non-travel interest of the first user matches a non-travel interest of the second user.

4. The method of claim 3, wherein the non-travel interest of the first user is stored in the profile information of the first user.

5. The method of claim 1, wherein the community and the one or more existing communities each provide interaction by at least one of: a message forum specific to the respective community, a chat room specific to the respective community or an e-mail listserv specific to the respective community.

6. The method of claim 1, wherein the trip data of the first user includes a specified destination and wherein receiving the trip data of the second user comprises receiving the trip data of the second user while the second user is traveling to the specified destination.

7. The method of claim 6, wherein determining whether the trip data of the second user matches the trip data of the first user comprises determining whether the first user and the second user are projected to arrive at the specified destination within a predefined amount of time of each other.

8. The method of claim 1, wherein determining whether the trip data of the second user matches the trip data of the first user includes determining whether a specified destination of the first user and a destination of the second user are within a predefined proximity.

9. The method of claim 1, wherein determining whether the trip data of the second user matches the trip data of the first user includes determining whether a first mode of travel of the first user matches a second mode of travel of the second user.

10. An apparatus comprising:
at least one processor; and
at least one memory storing instructions configured to, with the at least one processor, cause the apparatus to at least:
receive trip data of a first user associated with a first mobile device, wherein the trip data of the first user relates to a trip by the first user and includes first position information determined by an automated navigation engine of the first mobile device, wherein the first position information indicates one or more positions of the first mobile device, each of the one or more positions of the first mobile device being a position of the first mobile device at an instance of time;
receive trip data of a second user associated with a second mobile device, wherein the trip data of the second user relates to a trip by the second user and includes second position information determined by an automated navigation engine of the second mobile device, wherein the second position information indicates one or more positions of the second mobile device, each of the one or more positions of the second mobile device being a position of the second mobile device at an instance of time;
determine whether the trip data of the second user matches the trip data of the first user;
determine whether profile information of the second user matches profile information of the first user; and
in response to determining that the trip data associated with the second user matches the trip data of the first user and to determining that the profile information of the second user matches the profile information of the first user:
determine a set of criteria from the trip data of the second user and the trip data of the first user;
compare data of one or more existing communities with the set of criteria,
determine that the one or more existing communities do not match the set of criteria based on the comparison,
responsive to determining that the one or more existing communities do not match, create a community between the first and second users that is accessible to the first user and the second user and provides interaction between the first user and the second user, and
transmit, to each of the first mobile device and the second mobile device, a notification identifying the community.

11. The apparatus of claim 10, the memory further instructions configured to, with the at least one processor, cause the apparatus to:
determine information indicative of interests of the second user,
filter the information indicative of the interests of the second user based on the profile information of the first user, wherein said filtering includes filtering out at least one indication of interest from the information indicative of the interests of the second user and said filtering results in filtered information indicative of at least one interest of the second user, and
transmit, to the first mobile device, the filtered information indicative of at least one interest of the second user.

12. The apparatus of claim 10, wherein determining whether the trip data of the second user matches the trip data of the first user comprises determining whether a non-travel interest of the first user matches a non-travel interest of the second user.

13. The apparatus of claim 10, wherein the trip data of the first user includes a specified destination and wherein receiving the trip data of the second user comprises receiving the trip data of the second user while the second user is traveling to the specified destination.

14. The apparatus of claim 13, wherein determining whether the trip data of the second user matches the trip data of the first user comprises determining whether the first user and the second user are projected to arrive at the specified destination within a predefined amount of time of each other.

15. One or more non-transitory computer readable media storing computer readable instructions that, when executed by one or more processors, cause an apparatus to at least:
receive trip data of a first user associated with a first mobile device, wherein the trip data of the first user relates to a trip by the first user and includes first position information determined by an automated navigation engine of the first mobile device, wherein the first position information indicates one or more positions of the first mobile device, each of the one or more positions of the first mobile device being a position of the first mobile device at an instance of time;
receive trip data of a second user associated with a second mobile device, wherein the trip data of the second user relates to a trip by the second user and includes second position information determined by an automated navigation engine of the second mobile device, wherein the second position information indicates one or more positions of the second mobile device, each of the one or more positions of the second mobile device being a position of the second mobile device at an instance of time;
determine whether the trip data associated with the second user matches the trip data of the first user;
determine whether profile information of the second user matches profile information of the first user; and
in response to determining that the trip data associated with the second user matches the trip data of the first user and to determining that the profile information of the second user matches the profile information of the first user:
determine a set of criteria from the trip data of the second user and the trip data of the first user;
compare data of one or more existing communities with the set of criteria, determine that the one or more existing communities do not match the set of criteria based on the comparison, responsive to determining that the one or more existing communities do not match, create a community between the first and second users that is accessible to the first user and the second user and provides interaction between the first user and the second user, and transmit, to each of the first mobile device and to the second mobile device, a notification identifying the community.

16. The one or more non-transitory computer readable media of claim 15, further storing computer readable instructions that, when executed by the one or more processors, cause the apparatus to:

determine information indicative of interests of the second user, filter the information indicative of the interests of the second user based on a user profile the profile information of the first user, wherein said filtering includes filtering out at least one indication of interest from the information indicative of the interests of the second user and said filtering results in filtered information indicative of at least one interest of the second user, and transmit, to the first mobile device, the filtered information indicative of at least one interest of the second user.

17. The one or more non-transitory computer readable media of claim 15, wherein determining whether the trip data of the second user matches the trip data of the first user comprises determining whether a non-travel interest of the first user matches a non-travel interest of the second user.

18. The one or more non-transitory computer readable media of claim 15, wherein the trip data of the first user includes a specified destination and wherein receiving the trip data of the second user comprises receiving the trip data of the second user while the second user is traveling to the specified destination.

19. The one or more non-transitory computer readable media of claim 18, wherein determining whether the trip data of the second user matches the trip data of the first user comprises determining whether the first user and the second user are projected to arrive at the specified destination within a predefined amount of time of each other.

\* \* \* \* \*